Nov. 12, 1935.  S. D. MITEREFF  2,020,847
AUTOMATIC REGULATOR AND METHOD
Filed Jan. 17, 1931   7 Sheets-Sheet 3

Inventor
Sergei D. Mitereff,
By Foster & Codier
Attorney

Nov. 12, 1935.   S. D. MITEREFF   2,020,847
AUTOMATIC REGULATOR AND METHOD
Filed Jan. 17, 1931   7 Sheets-Sheet 4
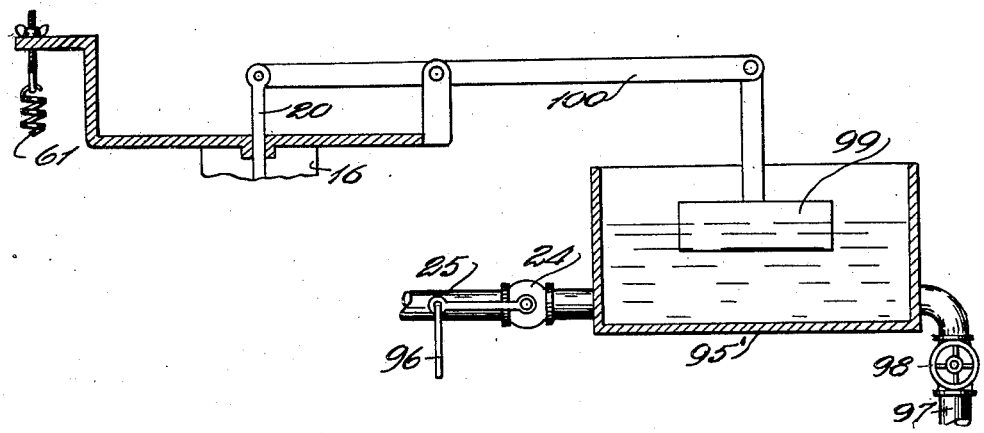
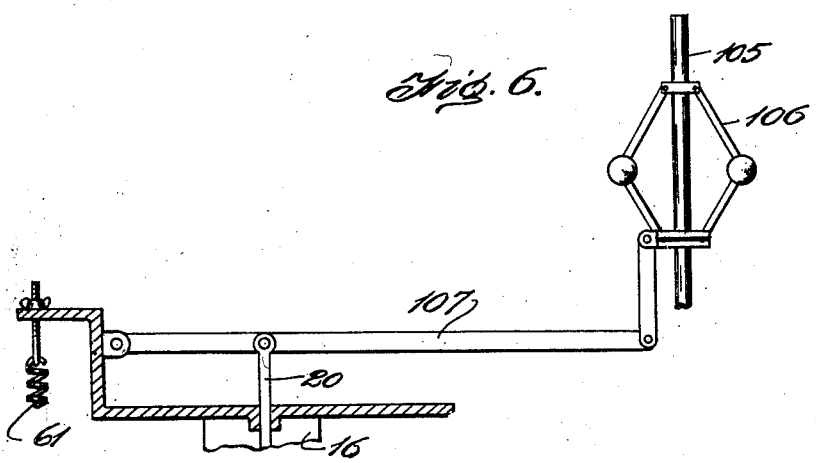

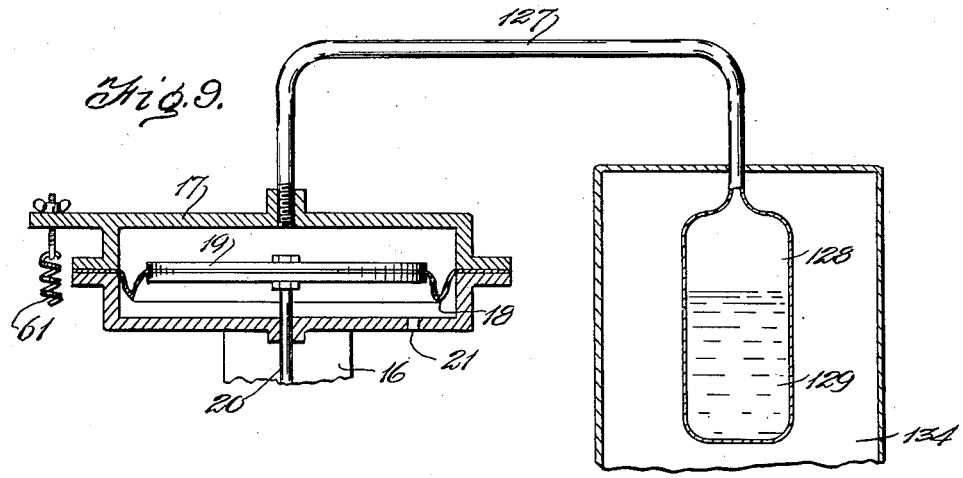
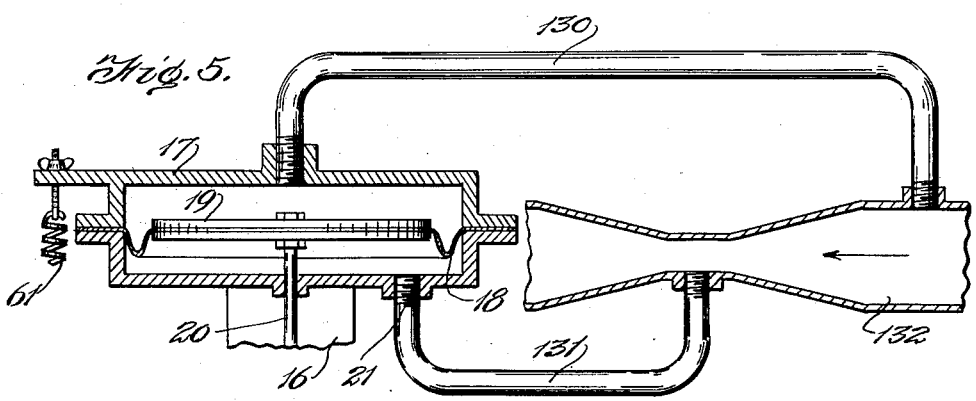

Nov. 12, 1935.  S. D. MITEREFF  2,020,847
AUTOMATIC REGULATOR AND METHOD
Filed Jan. 17, 1931  7 Sheets-Sheet 6
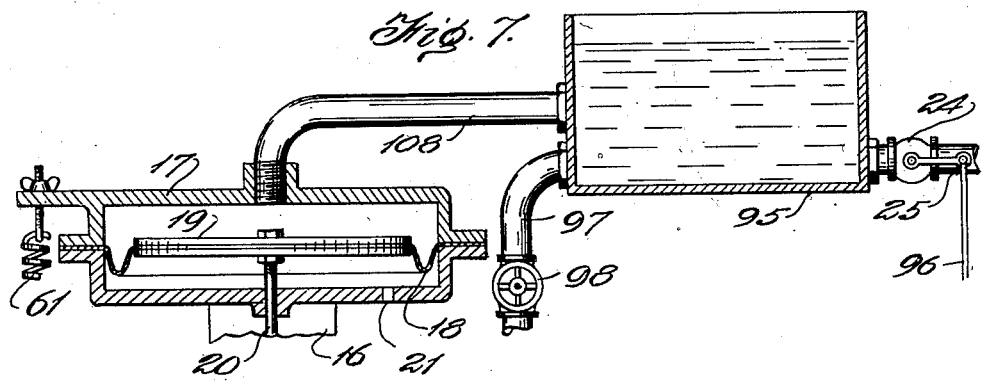
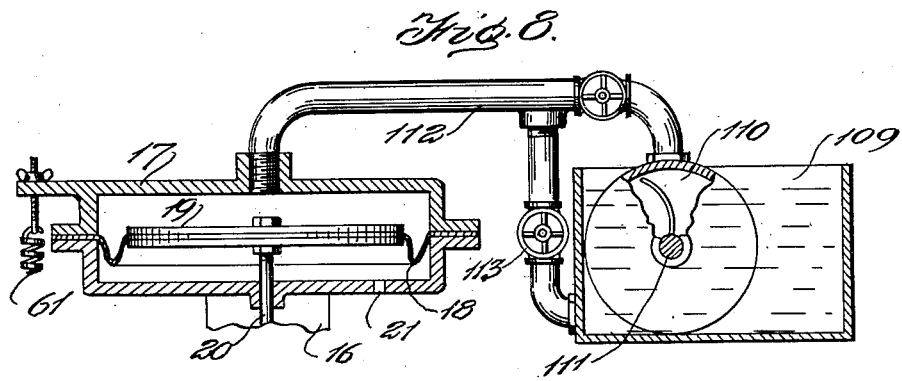

Patented Nov. 12, 1935

2,020,847

UNITED STATES PATENT OFFICE 2,020,847

AUTOMATIC REGULATOR AND METHOD

Sergei D. Mitereff, Petersburg, Va.

Application January 17, 1931, Serial No. 509,458

19 Claims. (Cl. 137—78)

This invention relates to a method of and apparatus for maintaining, in a given system, a variable element constant within desired limits, which element is either a direct or indirect function of power supply (or demand) in this system, and has special reference to the automatic control of this power supply (whether the same be derived from fluid, electrical, kinetic, gravitational, thermal, chemical or other sources), by a regulator responsive to variations in the intensity of impulsive power supplied to the regulator (whether the same be derived from fluid, electrical, kinetic, gravitational, thermal, chemical or other sources), which impulsive power is either a direct or indirect function of the above variable element.

There are two factors to the variations in the intensity of this impulsive power.

This power variation may be viewed as changes in magnitude irrespective of the time taken for the change or as changes in the time necessary to effect the variation of a given magnitude. That is, there exists in every variation of this class a change in magnitude of variation and a change in velocity of variation.

The present method involves the combination of variations in both the magnitude and the velocity of the impulsive power for the purpose of controlling power supply to a translating device arranged to effect the desired result.

It is here to be noted that the impulsive power may be of one form while the translating device may use a second form of power, or the power supplied to the translating device may be controlled by its own variations.

As typical of the first condition the variations in impulsive power may be those due to variations in the steam pressure in a boiler while the power controlled may be the power, of whatever character, used in the operation of a stoker motor or boiler draft blower serving as a translating device and utilized to control the steam production in the boiler and thus, by the control of the translating device, to maintain constant pressure in the boiler.

As typical of the second condition the variations acting as controls may be those occurring in the steam supply to a translating device in the form of a spillover valve, arranged to keep the constant pressure on its upstream side.

The apparatus used as a regulator effectively combines both magnitude and velocity of variations in a given power supply as a controlling means for the same or another type of power supply.

In this regulator the primary effects of both the changes of magnitude and of changes of velocity are combined in such a way as to produce a final single effect of the regulator which is proportional to the algebraic sum of the two primary effects, and which at the same time is powerful enough to be used for power flow control purposes.

The above stated principal characteristic of my rate responsive regulator can be expressed mathematically as follows:

$$F_1 = k_1 P \quad \quad \text{(A)}$$

$$F = k_2 \left(\frac{dP}{dT}\right)^2 \quad \quad \text{(B)}$$

$$F_2 = k_2 \left(\frac{dP}{dT}\right) \quad \quad \text{(B')}$$

$$k_3 F = F_1 + F_2 = k_1 P + k_2 \left(\frac{dP}{dT}\right)^2 \quad \text{(C)}$$

$$k_3 F = F_1 + F_2 = k_1 P + k_2 \left(\frac{dP}{dT}\right) \quad \text{(C')}$$

Where:

$P$—Deviation of the primary impulse from its normal value.

$F_1$—One intermediate effect.

$F_2$—Another intermediate effect.

$F$—Final effect of the regulator.

$T$—Time.

$d$—Mathematical symbol used in calculus designating an infinitesimally small increment.

$k_1$; $k_2$; $k_3$—Arbitrary constants depending upon the adjustment of the regulator.

Notes:

Equations (B) and (C) refer to regulator which has a dash pot type of the rate responsive element. Equations (B') and (C') refer to a regulator which has a solenoid type of the rate responsive element $$\left(\frac{dP}{dT}\right)^2$$

This expression designates the square of the absolute value of the ratio $$\left(\frac{dP}{dT}\right)$$

but does not affect its sign.

The type of regulation obtained with a regulator having the above stated basic characteristics has several fundamental advantages over the type of regulation obtained even with the best power flow regulators known to the art previous to this invention, since first of all, its "rate" characteristic counteracts entirely the effect of long pilot lines or similar causes which delay the transmission of impulses between the medium to be controlled and the regulator. This time lag is the main cause of objectionable oscillations of such control systems known to the art as "hunting".

Practically all previous efforts to design a regulator which would not hunt were centered upon means to sufficiently retard the action of the regulator by a dash pot or other suitable device to reduce the natural frequency of the oscillation of the regulating system considerably below the prevailing frequency of oscillation of the primary impulses. This retardation or slowing down of the regulator is often successful in eliminating the hunting but it is objectionable from the standpoint of accuracy of the regulation especially in cases, as, for example, one involving the combination of long pilot line with widely fluctuating flow, which requires a regulator which is free from hunting and which at the same time is capable of quick response to the impulses, if close regulation is to be maintained.

It will be clear, therefore, to those skilled in the art that my method of regulation does away with hunting by an expedient opposite to that used most frequently in an ordinary regulator. The rate responsive feature of my regulator advances in respect to time instead of retarding the response of the whole regulator to the impulses as they reach the regulator and in this way it counteracts the delaying action of pilot lines or other causes.

It is evident also that those parts of my regulator which give to it the rate responsive characteristic may be considered also as a change anticipating and as a principal feature of my regulator and of any other regulator, for that matter, if suitably attached to it.

The second advantage of my method of regulation is that in those cases where there is no appreciable time lag in transmitting the impulses, my regulator is capable of a degree of accuracy much greater than is obtainable from any of the ordinary regulators, due to their less adequate basic characteristic.

Finally, by superimposing one of my rate responsive regulators upon the other similar regulator in such a manner as to make the effect of the first regulator serve as the impulse for the second, it is possible to produce a controlling effect of the second regulator which is proportional primarily to the rate of the rate at which the impulses are decreasing or increasing.

In this way just as close regulation will be obtained in cases with time lag as is possible to obtain with a single rate responsive regulator to which the impulses are transmitted from their source with no time lag.

The above statements will be further amplified and explained by referring to the following basic principles of power flow regulation.

In practically all cases of power flow regulation there are three essential factors:

1. Variable inflow of power to the container or translating device which may be expressed as the amount of power passing into the container per unit of time.

2. Amount of power stored in a container or utilized by a translating device as evidenced by some physical quantity directly proportional to the amount of power stored or utilized, such for example, as the height of liquid in a tank, pressure of gas in a closed vessel, temperature of a body, speed of a moving or rotating mass and others.

3. Variable outflow of power from the container which may be expressed as amount of power passing out of the container or from the translating device per unit of time.

In the great majority of cases of power flow regulation the problem is to keep constant the physical quantity indicating the amount of power stored or used, by automatically controlling either the inflow or outflow of power as the case may require, to correspond with variable uncontrollable outflow and inflow respectively.

The automatic regulator which controls the flow is usually receiving its impulses from the deviation of a physical quantity to be kept constant, from its normal desired value.

In the way of illustration and proof of the above statements several representative examples of automatic power flow regulation are cited below.

*Example I.—Pressure control of an elastic fluid*

In this instance the pressure in a vessel such as a pipe line, for example, is the correct indication of the amount of fluid stored in the vessel since it is proportional to it. It is desired ordinarily to keep this pressure constant by actuating a valve which controls either the inflow to or the outflow from the vessel as the case may require, by means of an automatic regulator responding to the pressure in the vessel.

When the inflow or in other words the supply of elastic fluid is an uncontrollable variable the regulation is known as the upstream pressure regulation, since the pressure to be maintained constant and therefore the regulator pilot line connection are on the upstream side of the fluid flow controlling valve which is actuated by the pressure regulator.

The valve in this case regulates the outflow to correspond at all times with inflow and thus to keep the pressure in the vessel constant.

When, however, the outflow or in other words the demand is the independent variable the regulation is of the type known as downstream pressure regulation. The valve in this case controls the inflow to correspond with outflow and it functions therefore as a reducing valve. In this as well as in other cases of power flow regulation, the impulses as they reach the regulator may take the form of either pressure or force or electric current or any other energy manifestation suitable for the case under consideration, depending upon the impulse transforming and transmitting means used and the type of impulse responsive element of the regulator employed.

*Example II.—Liquid level control*

This case is similar to pressure regulation except that since liquid is an inelastic fluid the level in the vessel rather than the pressure is the indication of the amount of fluid stored and therefore the regulator receives its impulses from deviation of level of the liquid in the vessel from the normal.

*Example III.—Speed regulation of a prime mover*

In this case the outflow of power is an independent variable and is represented by the electrical or mechanical energy demand upon the prime mover.

The inflow of power is represented by a supply of energy to the prime mover which is under the control of a speed regulator responding to the speed of the prime mover through the action of the centrifugal force produced by the rotation of the prime mover.

The energy supplied to the prime mover may be either in potent form such as electricity or in latent form carried by fluids such, for example, as steam, water under pressure, compressed air, fuel oil, depending upon the character of the prime mover.

The third essential quantity of power flow regulation, namely the amount of power in storage is represented by the kinetic energy of the prime mover and the system connected to it.

The rotative speed of the prime mover is the physical quantity indicating the amount of energy so stored and from which the speed regulator derives its impulses.

*Example IV.—Temperature control*

In this case the outflow or demand upon the thermal energy of a body is ordinarily an independent variable and therefore the inflow or supply of thermal energy or power is under the control of an automatic regulator which responds to the temperature of the body which it is desired to maintain constant.

The supply of thermal energy can be either in direct form as such or in the latent form carried by fuel or by sensible heat of fluids at an elevated temperature.

The storage factor is represented by the heat storing capacity of the body while the temperature of the body being proportional to the amount of heat stored is the physical quantity indicating the amount of heat stored which gives rise to the impulses actuating the temperature regulator.

*Example V.—Combustion control of a steam generator*

In this case the steam output of a generator is the independent variable power outflow, whereas the input of heat energy, in latent form of mixture of fuel and air, is the inflow under the control of the combustion regulator responding to the pressure in the steam generator. The pressure in this case is a physical quantity proportional to the amount of heat stored in the steam generator.

*Example VI.—Constant flow regulation*

In this case it is desired to keep constant the fluid flow in a conduit in spite of a fluctuating pressure or potential producing this flow.

The regulator controls the flow by means of a valve and it receives its impulses direct from the flow itself in the form of velocity head in the conduit as measured by the Pitot tube, Venturi tube or other suitable means.

In this instance the storage factor is represented by the kinetic energy of moving fluid in the conduit. The inflow is represented by the energy of the static head necessary to accelerate the fluid while the outflow is represented by the controllable energy loss due to throttling of fluid through the control valve.

It is clear from the foregoing examples that the term "power" is used in this specification in its broadest sense and it includes not only gases, vapors and liquids under pressure, but also all forms of energy potent as well as latent.

Since my rate responsive regulator is especially adapted for any power flow regulation dealing with inflow, outflow and storage and since as is shown by the above examples all automatic power control problems fall under this classification, it follows that the field of application of my regulator is universal and is in no way limited to those specific cases which will be cited for convenience only in describing the detailed construction and operation of the few preferred modifications of my regulator.

It follows also from the foregoing explanation that the basic difference between my regulator and all other power flow regulators is not in the field of possible application but in the manner in which my rate responsive regulator responds to the impulses sent to it, either in the form of fluid pressure through pilot lines, or in the form of force transmitted by leverage, or in the form of electricity transmitted by wires, or in any other suitable form known to the art.

My regulator responds not only to the deviation of the impulse sending quantity from the normal but also and primarily to the velocity at which this quantity is increasing or decreasing.

The importance and advantages of this manner of response can be better appreciated by those skilled in the art from the following reasoning.

It follows from the law of conservation of matter and energy that if the amount of power stored in a receptacle or translating device having variable inflow and outflow is constant, it means that the inflow is equal at any given moment to outflow.

Conversely, any difference between inflow and outflow is bound to result in the changing amount of power in storage.

The most significant fact in connection with my regulator is that the rate or, in other words, the speed at which the amount of power in storage evidenced by the controlled quantity (i. e. pressure, level, temperature, speed, etc.), is increasing or decreasing is directly proportional to the difference between power inflow and outflow.

All other flow regulators respond in one way or another only to the amount or sometimes even only to the sign of deviation of the controlled quantity from the normal without responding at all directly and distinctly, as does my regulator, to the rate of change of the controlled quantity.

In this way an ordinary regulator is contingent for its very operation upon the deviation of the controlled quantity from its normal value with the result that the wider are the fluctuations in the power flow, the wider must be deviations of the controlled quantity from its normal value to produce impulses large enough to operate the regulator through the range or with the speed required.

Since my regulator has primarily a straight line or so called "proportional position characteristic" in respect to the rate of change of controlled quantity and since this rate is proportional to the difference between inflow and outflow, it follows that the moment the controlled quantity begins to change at a certain rate my regulator, if properly adjusted, will immediately produce a controlling effect (such as movement of valve, for instance) which will equalize the inflow with outflow and thus will maintain the controlled quantity constant irrespective of the magnitude of variation of the uncontrolled fluid flow, anticipating rather than depending for its operation upon definite deviations of the controlled quantity from its normal value.

If, however, in spite of operation of the rate responsive feature of my regulator, there still exists some deviation of the controlled quantity from its normal value, my regulator will respond to this deviation at least as well as any other regulator and thus will correct whatever inaccuracy there may exist due to imperfect operation of the rate responsive feature of my regulator. It is believed that the truth of the above statements will be made evident by the later explanation of the functioning of my regulator and no mathematical proof is therefore presented.

It may not be readily seen, however, how the rate responsive characteristic of my regulator will counteract the effect of long pilot lines or other causes delaying the transmission of impulses from their source to the regulator. A simple mathematical proof of this statment is therefor presented below.

Assume, for example, a case when it is desired to maintain a constant gas pressure in a vessel to which the inflow is variable, by varying the outflow with a valve in the outflow line.

Assume also that my rate responsive regulator receives its impulses in the form of gas pressure transmitted to it from the vessel by a long pilot line, and that the effect of the regulator is used for moving the valve—opening it when the pressure increases and closing it when the pressure decreases.

Assume further that the shape of the valve is such that it produces an equal increase of gas flow through it for a given amount of its travel throughout its whole range from closed to open position.

It is evident that increase or decrease of pressure in the vessel will not be transmitted to the regulator instantaneously, because the volume of the pilot line provides a storage for the gas which has to be filled or emptied before the full pressure can reach the regulator, and because gas can enter into or exit from the pilot line, but only so fast on account of orifice effect and friction losses in the pilot line.

Since the orifice effect and friction losses, which are equal to the difference in pressure at each end of the pilot line, increase as the square of the gas velocity in the pilot line, and since rate of change of pressure at the regulator end of the pilot line is directly proportional to the velocity of gas flow into or out of the pilot line, the following relationship holds:

$$\left(\frac{dP}{dT}\right)^2 = k_4(P_1 - P) \quad \quad \quad (D)$$

Where:
P—Deviation of pressure from its normal value at the regulator end of the pilot line.
$P_1$—Deviation of pressure from the normal in the vessel.
$k_4$—Constant depending upon the physical characteristics of the pilot line such as length, diameter, friction factor, etc.
T—Time.
d—Mathematical symbol designating an infinitesimal increment.

Now, by substituting value of $$\left(\frac{dP}{dT}\right)^2$$

from Equation (D) into Equation (C) given previously as expressing the basic characteristic of my rate responsive regulator having a dash pot type of rate responsive element, we get:

$$k_3 F = k_1 P + k_3 k_4 (P_1 - P) \quad \quad (E)$$

or otherwise $$k_3 F = (k_1 - k_3 k_4) P + k_3 k_4 P_1 \quad \quad (F)$$

Now, since $k_1$ and $k_3$ are two perfectly arbitrary constants of adjustment, we are at liberty to so select them as to make $k_1 = k_3 k_4$ and by so doing to cancel the first term on the right side of the Equation (F) obtaining Equation (G) below:

$$k_3 F = k_3 k_4 P_1 \quad \quad \quad (G)$$

Since $P_1$ designates the pressure variation in the vessel proper, this equation means that the characteristic of the rate responsive regulator connected with a long pilot line to the source of impulses can be reduced by proper adjustment to an ordinary proportional position, or in other words, straight line characteristic in respect to the impulses at their source.

Using a method analogous to that just disclosed, it can be proven by anyone skilled in the art that if instead or in addition to the storage capacity of the pilot line there exists also inertia of the pressure transmitting medium (as would be decidedly the case, for example, with a pilot line filled with a liquid), the addition of the second derivative with respect to time (i. e. acceleration) to the characteristic of the regulator [i. e. to the right hand side of either Equation (C) or (C')] will enable the regulator to counteract the type of time delay in transmitting of impulses arising from the inertia of the transmitting means or causes of the similar effect.

The Equations (C) and (C') will in this case read, therefore, as (H) and (H') respectively, below:

$$k_3 F = k_1 P - k_2 \left(\frac{dP}{dT}\right)^2 - k_4 \left(\frac{d^2 P}{dT^2}\right)^2 \quad \quad (H)$$

$$k_3 F = k_1 P - k_2 \left(\frac{dP}{dT}\right) - k_4 \left(\frac{d^2 P}{dT^2}\right) \quad \quad (H')$$

Where the same notations are used as are in the case of Equations (C) and (C'), except that $k_4$ is still another arbitrary constant of adjustment.

It is understood also that any of the constants $k_1$, $k_2$, or $k_4$ can be reduced either to zero either by adjustment or by omission of suitable working parts of the regulator if so desired, or else can be made to be adjustable automatically by the movement of any desired part of the regulator.

The physical means used to reduce the characteristics (H) and (H') to practice may consist for example of either two whole regulators of the characteristics (C) or (C') arranged to actuate each other in series as was already explained elsewhere in this specification, or else may consist of just two rate responsive elements proper arranged to actuate each other in series, thus producing an effect which is a second derivative of the impulses with respect to time and of making the regulator to linearly respond also to this effect in addition to the response of the regulator already described and as expressed by the Equations (C) and (C').

It is not deemed necessary however to show the detailed arrangement of parts of a regulator having characteristics of Equations (H) or (H') as it is obvious that anyone skilled in the art will be able to construct with this specification before him, a regulator of such a characteristic.

It is obvious also that by using the method above described the third and higher order of the derivative of the impulses with respect to time could be added to the characteristic of the regulator [i. e. to the right hand side of the Equations (C) and (C')] in addition to the second derivative, if the conditions so require.

It will be clear to those skilled in the art that the effect of the regulator so obtained can be used either directly for control purposes (that is for moving the valve in this particular instance) as is proven by the successful operation of numerous regulators of simple proportional position characteristic, or else, since the effect is directly proportional to impulses at their source, this effect can be made to act as an impulse for another rate responsive regulator whose effect will have, therefore, a regular rate characteristic (as defined in Equations (C) or (C') of this specification) in respect to impulses at their source, notwithstanding the delay caused by a long pilot line, and the effect of the second regulator so obtained could be used for flow regulating purposes.

In order to make apparent the physical means designed by me to accomplish all the results so far only theoretically outlined above, reference is made to drawings attached to this specification, which illustrate more or less schematically the principal parts of my rate responsive regulator and of certain preferred modifications thereof.

In the accompanying drawings like characters of reference indicate like parts in the several views.

Figure 3 is a similar view showing a third form of the regulator.

Figure 4 is a detail section showing the upper part of the regulator as used to control the level of fluid in a tank.

Figure 5 is a detail showing the manner in which the regulator can be applied for the constant fluid flow control.

Figure 6 is a detail showing the manner of attaching the regulator to a governor device of a steam engine or other prime mover for the regulation of the power supply to the prime mover.

Figure 7 is a detail showing a second method for maintaining water level in a tank.

Figure 8 is a detail showing apparatus used in connection with a rotary shaft.

Figure 9 is a detail disclosing the application of the regulator to a temperature control.

Figure 12 is a detail of a certain valve device used herewith.

Figure 13 is a detail of a modified valve device.

Figure 1:
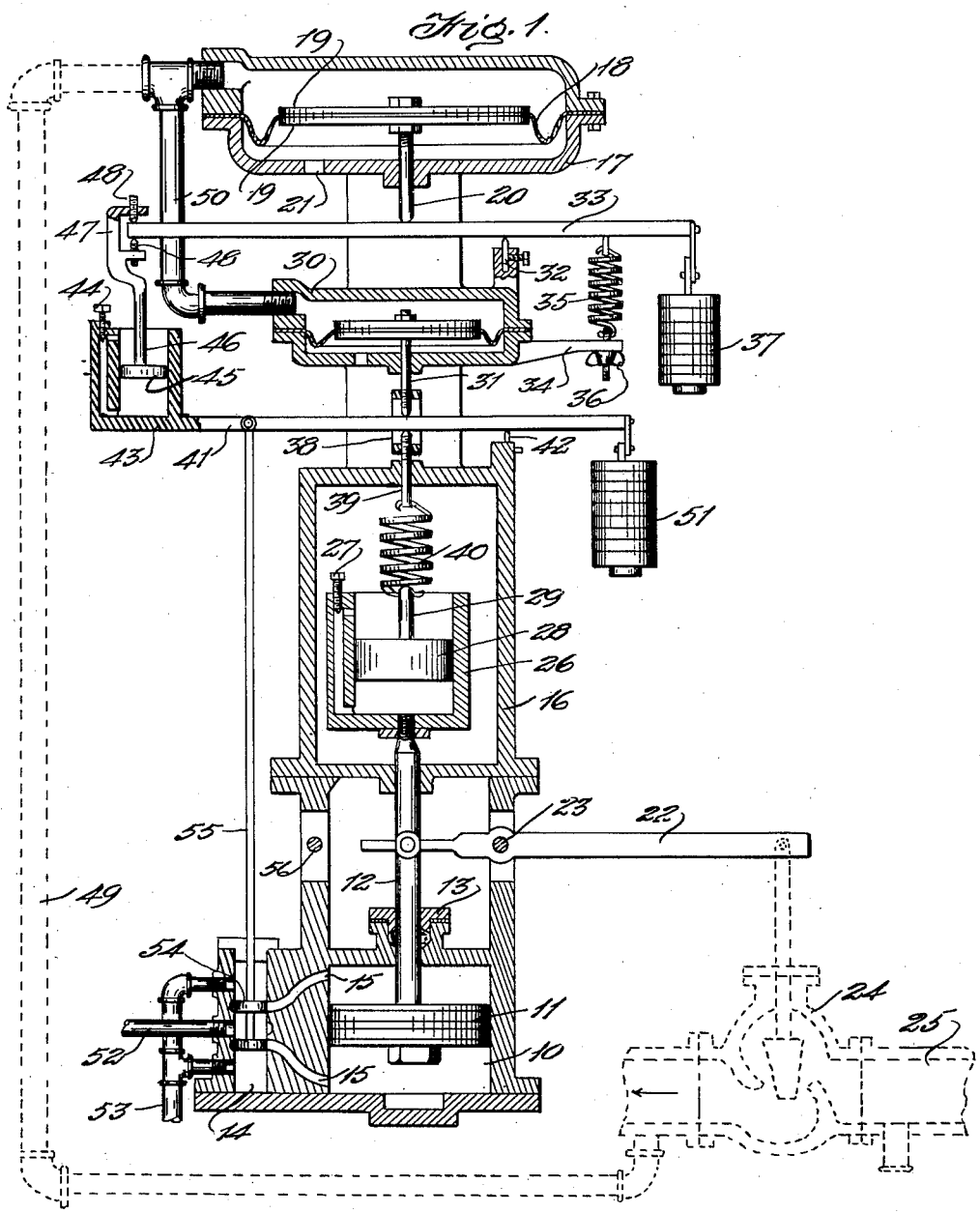
Figure 1 is a vertical sectional view of one form of regulator constructed in accordance with this invention and shown as actuated by and controlling fluid flowing through a pipe.

In each of the regulators here used there is employed a cylinder 10, wherein is a piston 11 carrying a rod 12 which projects upwardly through a stuffing box 13. A valve chest 14 is arranged at one side of the cylinder 10 and communicates therewith through ports 15. A frame or casing 16 projects upwardly from the cylinder 10 and the rod 12 projects into the lower part of this casing. In each of the forms shown in Figures 1, 2, and 3, a pressure cell 17 is fixed to the top of the frame and across this cell extends a flexible diaphragm 18 against the opposite sides of which are clamped plates 19, and projecting downwardly from the bottom plate is a stem 20. It will be noted that this stem is used in one form or another in each embodiment of the invention here shown. An escape port 21 is formed in the cell 17 below the diaphragm.

In the form of the apparatus disclosed in Figure 1, a lever 22 extends through the casing 16 and is pivoted thereto at 23. The inner end of this lever is carried by the rod 12 and the outer end of the lever is shown as connected to a valve 24 controlling the flow of fluid through a pipe 25 which represents a supply pipe to a device to be governed. On the upper end of the rod 12 is mounted a dash pot 26 having a controlling valve 27. In this dash pot moves a piston 28 carrying an upwardly projecting rod 29. Fixed to the frame 16 is a second or lower pressure cell 30 similar in construction and arrangement to the cell 17 and having a stem 31 corresponding to the stem 20 in the upper cell, the two stems 20 and 31 being vertically alined. A fulcrum 32 projects upwardly from one side of the cell 30 and on this fulcrum is balanced a lever 33 having a long arm which extends diametrically across the cell 30 and has the stem 20 resting thereon. An arm 34 projects from the cell 30 beneath the short arm of lever 33 and connected to arm 34 and lever 33 is a tension spring 35 provided with adjusting means 36. Counterweights 37 may also be suspended from this short arm. The stem 31 projects downwardly into the upper end of a stirrup or link 38 and a corresponding stem 39 projects upwardly into the bottom end of the link and is connected by a tension spring 40 with the upper end of the piston rod 29. The stems 31 and 39 engage a lever 41 on the top and bottom thereof and this lever rests on a fulcrum 42 carried by the frame 16. At the end of the long arm of this lever is fixed a dash pot 43 controlled by a valve 44 and having a piston 45. A rod 46 extends up from this piston and carries an open sided yoke 47 at its upper end. Opposed knife edges 48 are carried by the yoke and engage the upper and lower sides of the lever 33. A pipe 49 leads from the pipe 25 on the delivery or outflow side of valve 24 to the upper cell 17 above its diaphragm, and a branch pipe 50 connects pipe 49 to the lower cell 30 above its diaphragm. Counterweights 51 are suspended from the short arm of the lever 41. The two dash pots are of the liquid filled type. Connected to the valve chest 14 is a supply pipe 52 communicating with the center of the valve and an exhaust pipe 53 leads from the ends of this chest. A piston valve 54 of the usual type controls the connection of the pipe 52 with the ends of the cylinder 10 and the connection of these ends with the exhaust pipe. A stem 55 connects this valve with the lever 41 adjacent the dash pot.

The upper side of each pressure cell diaphragm is exposed to pressure transmitted to both elements through the pilot line 49 from the pipe 25, fluid flow through which is controlled by the position of the valve 24.

The downward force exerted by the diaphragm of cell 30 is transmitted by means of the stem 31 to the lever 41 pivoted at the knife edge support 42. This force is balanced by the adjustable weight 51 and also by the tension of the spring 40, the upper end of which is attached to the lever 41 while its lower end is hooked to the weight in the form of a dash pot piston 28. The dash pot 26 of this piston is filled with a liquid which can flow from one side of the dash pot to another through the bypass, the opening of which is adjusted by means of the valve 27.

The downward force of the diaphragm 19 on the other hand, is transmitted through the stem 20 to the lever 33 pivoted on the knife edge support 32. This force is balanced only by the adjustable weight 37 and by the tension of the spring 35, both attached to the right side of the lever 33, since whatever pressure may exist under the dash pot piston 45 suspended from the knife edge support 48 on the left hand side end of the lever 33, is purposely made so small as to be negligible in its effect on lever 33.

Piston 45 has enough clearance to move freely in the dash pot 43 attached to the left hand side end of the lever 41.

This dash pot is filled with liquid which can flow between upper and lower parts of the dash pot through the bypass, the opening of which is adjustable by means of the valve 44.

The parts so far described and especially the dash pot 43 with piston 45 provide the characteristic of the regulator, since the lower parts of the regulator provide only the motive force necessary to operate valve 24. The source of energy for the regulator in this case is auxiliary fluid under high pressure supplied through the pipe 52 from some suitable source.

This fluid is directed by means of the piston valve 54 either to the upper or the lower side of the operating piston 11 through ports 15.

In its neutral position pilot valve 54 just covers both ports 15 and thus prevents the piston 11 from moving. It requires, however, only a very small movement of the valve 54 to connect one end of the operating cylinder with pressure pipe 52, and the opposite side to exhaust pipe 53 which serves as a free drain. In this way the operating piston 11 can be moved with a considerable force either upwardly or downwardly, depending on whether the valve 54 is moved downwardly or upwardly from its neutral position respectively.

Due to the fact that the fluid under pressure is admitted to the middle of the cylindrical pilot valve 54, this valve is always hydrostatically balanced and since both ends of the valve 54 are freely drained this feature permits elimination of a packing gland around the valve stem 55. The force required to move valve 54 is, therefore, negligible.

The upward movement of the operating piston 11 closes the fluid flow regulating valve 24 and the downward movement opens it.

Opening of the bypass of dash pot 26 is so adjusted by the valve 27 as to allow the piston 28 to move in respect to the dash pot 26 at only a very slow rate.

It may be assumed, therefore, that under ordinary operating conditions the dash pot 26 and its piston 28 are moving up and down as a unit, relieving or extending spring 40, respectively.

If, however conditions are such that the operating piston 11 is at a standstill for a considerable period of time the piston 28 will sink or rise in the dash pot 26 until the tension of the spring 40 is exactly equal to the weight of the piston 28.

Moreover, if the operating piston 11 is at the standstill it means that the valve 54 is in the neutral position and this in turn means that both pressure responsive cells 17 and 30 are in balance.

Assume now that the pressure in the pilot line 49 begins to increase due to reduced demand on the fluid which flows through the valve 24 in the direction shown by the arrow.

The diaphragm 18, the lever 33 and the spring 35 are so proportioned and the bypass opening of the dash pot 43 is so adjusted as to make the retarding effect of the liquid in the dash pot 43 on the movement of the lever 33 so slight as to be negligible.

Therefore, every small addition to fluid pressure on the top of diaphragm 18 will be immediately balanced by a corresponding small additional pull of the spring 35, effected by the corresponding small downward movement of the left hand end of the lever 33 together with the suspended piston 45.

It is evident from the above that the faster the pressure is increasing on top of the diaphragm 18 the faster will be the downward movement of the dash pot piston 45.

But, since in order for the piston 45 to move in respect to its dash pot 43 a certain amount of liquid has to be forced through the bypass from one side of the piston to the other, and since the pressure difference between two sides of any fixed orifice is proportional to the square of the velocity of the liquid flowing through the orifice, it means that as long as the pressure on the top side of the diaphragm 18 is increasing there will be a force exerted upon the left hand side end of the lever 41 to which the dash pot 43 is attached and that this force will be proportional to the square of the rate at which the fluid pressure on the top side of the diaphragm 18 is increasing.

At the same time the increasing pressure in the pilot line 49 will be transmitted also to the top side of the diaphragm of the cell 30, which will exert also a downward force on the lever 41. Since this force is transmitted to the lever 41 directly by the stem 31 it will be proportional to the amount of increase in pressure on the top of the diaphragm of cell 30 above the normal value for which the regulator was originally balanced.

Both of these forces, that is, the force proportional to the square of the rate of fluid pressure increase, as generated by the cell 17 through dash pot 43, and the force proportional to the amount of pressure increase, as exerted by cell 30 through stem 31, will unbalance the lever 41 and will tend to move downwards its left hand side end and thus move the attached piston valve 54.

No appreciable movement of the lever 41 can take place, however, because as soon as the valve 54 uncovers, ever so slightly, the ports 15 leading to the operating piston 11, the piston will move a sufficient distance upward to relieve tension of the spring 40 to the extent necessary to balance both forces on the lever 41 produced by the increasing fluid pressure, thus preventing the lever 41 from moving.

With reduced demand the upward movement of the operating piston 11 will mean a downward movement of the regulating valve 24 with the result that the supply of fluid through the valve 24 will be reduced to more nearly correspond with the reduced demand and the pressure on the downstream side of the valve 24 will, therefore, be lowered. If, however, in spite of the valve movement the pressure on the downstream side of valve 24 remains above the normal, the dash pot 26 will allow the piston 28 to gradually sink while the dash pot 26 will be gradually moved upwards by the operating piston 11 in order to keep the lever 41 in balanced position.

In this way a gradual compensating effect is produced which will prevent lower pressure being maintained by the regulator when the flow through valve 24 is small and will prevent high pressure being maintained when flow is large, due to variation in tension of the spring 40, which otherwise would have been produced by a different position of the valve 24 necessary to accommodate different flow.

If instead of increasing, as was assumed, the pressure in the pilot line 49 begins to decrease due to increased demand on the fluid flowing through the valve 24, the movement of the regulator will be reversed and valve 24 opened to keep the pressure constant.

It should be noted that under the ordinary conditions the various parts of the regulator are so proportioned and so adjusted as to make it respond primarily to the action of the cell 17 and dash pot 43.

The rate responsive regulator as shown in Figure 1 is used for downstream pressure regulation. It can be equally well used also for upstream pressure regulation provided lever 22 is pivoted on a pin 56 instead of pin 23 so as to reverse the movement of valve 24 in respect to movement of operating piston 11 and provided pilot line 49 is transferred to upstream connection from the downstream connection shown on Figure 1.

Referring back to Equation "C" it is seen that in the above described particular embodiment of my invention the primary "impulse" takes the form of fluid pressure as transmitted by the pilot line 49, while the "effect" of the whole regulator is represented by the amount of movement of the operating piston 11 and as transmitted by lever 22 to valve 24 and as affecting the flow through pipe 25.

Two separate intermediate "effects" to whose algebraic sum the "effect" of the whole regulator is proportional, are represented by forces generated in the cells 17 and 30 and as additively combined on the lever 41.

The straight line or "proportional position" relationship between the amount of movement of the operating piston 11 and the combination of forces of two cells is provided by the spring 40.

Since, due to its adjustment, the dash pot 26 provides only a secondary and auxiliary characteristic of the regulator, its effect was omitted in writing the Equation (C).

The arbitrary constants of adjustment $k_1, k_2, k_3$ in the Equation (C) depend upon the relative size of the diaphragms, the characteristics of the spring 35 and the spring 40 leverage ratios, and upon the adjustment of the dash pot bypasses.

Figure 2:
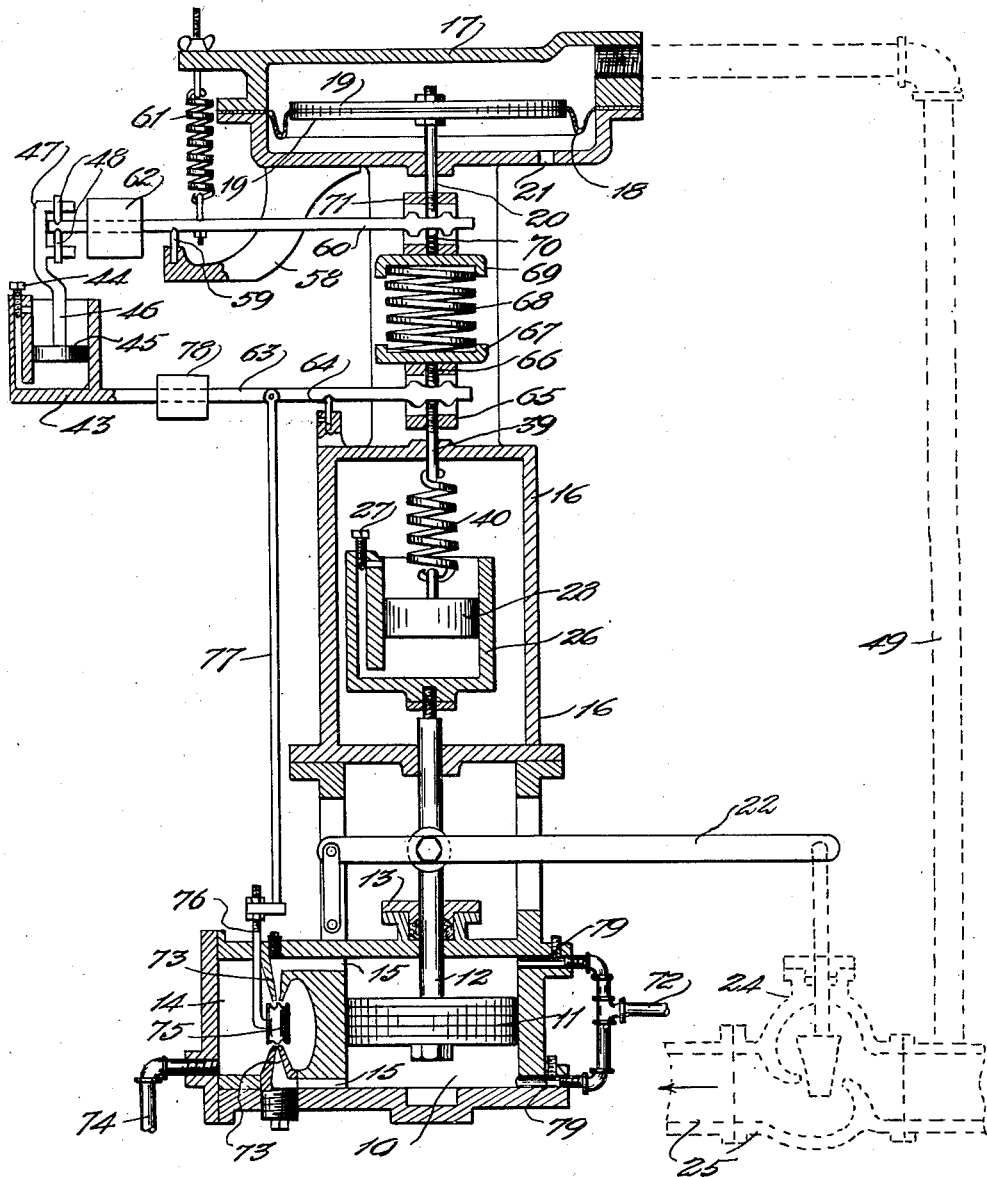
Figure 2 is a similar view showing a second form of such regulator.

In the form of the invention shown in Figure 2 the same two dash pots are used and are, of course, indicated by the same reference characters. In this form the rod 12 operates a lever 22 which controls the valve 24 and the dash pot 26 is carried on the stem 12 as before. An arm 58 projecting from the cell 17 carries a knife edge fulcrum 59 whereon is poised a lever 60 on which the stem 20 presses. An adjustable spring 61 pulls upwardly on this lever against the action of stem 20 and is assisted in this by a sliding weight 62. This lever has its end held between the knife edges 48. In this form the dash pot 43 is mounted on the end of a lever 63 which is supported on a knife edge fulcrum 64 carried by the frame 16. The other end of this lever rests on the stem 30 in a stirrup 65. Into the top end of the stirrup 65 extends a stem 66 carrying a spring seat 67 whereon is seated a spring 68. The upper end of this spring seats in a spring seat 69 carried by a stem 70 which projects upwardly and engages the under side of lever 60. A stirrup 71 connects the stems 20 and 70. A branched pipe 72 carrying auxiliary fluid under pressure communicates with both ends of the cylinder 10, the ports 15 acting as exhaust ports and being provided with opposed nozzles 73. An exhaust pipe 74 leads from the valve chest. At 75 is a double seated pilot valve which can be moved to close either nozzle or can be positioned to allow equal flow from both nozzles or greater flow from one than the other. This valve has a stem 76 which is connected by a rod 77 with the lever 63. A sliding weight 78 assists in balancing lever 63.

The modified regulator operates as follows.

As before pilot line 49 transmits the fluid pressure, which it is desired to keep constant, to the top side of the diaphragm 18. Downward force exerted by the diaphragm is balanced chiefly by the weight 62 and tension of the spring 61 both acting on the lever 60 pivoted on the knife edge support 59. A small upward force supporting diaphragm 18 to a certain extent is exerted also by the compressed coiled spring 68, which rests upon the right hand side of the lever 63. This lever is supported at the knife edge support 64 and it carries on its left hand end dash pot 43 inside of which moves the piston 45, as before.

Due to suitable proportioning of parts and adjustment of dash pot bypass by means of valve 44, the dash pot 43 does not appreciably retard the movement of the lever 60.

Since the lever 63 is held practically stationary due to causes explained later, any given change in pressure on the top of the diaphragm 18 means a certain definite vertical distance traveled by the diaphragm and therefore a certain definite corresponding change in force exerted by the spring 68 upon the right hand end of the lever 63. In other words, force on the lever 63 due to spring 68 is directly proportional to the pressure on the top of the diaphragm 18.

The force exerted by the dash pot 43 on the lever 63 is on the other hand, proportional to the square of the velocity of motion of the dash pot piston 45, and therefore to the square of the rate at which the pressure is changing on the top of the diaphragm 18.

The leverage is so arranged that these two forces are additive in their effort to rock the lever 63 on its support.

The purpose of the rest of the mechanism is to produce an effort which is directly proportional to the sum of the moments of the above forces in respect to support 64, and which at the same time is powerful enough for regulating purposes, such, for instance, as moving the valve 24.

The motive force for this effect is supplied by the auxiliary fluid under pressure entering through pipe 72 and drained out through pipe 74. This fluid is admitted to both sides of the operating piston 11 through adjustable orifices or ports 79.

The amount of fluid passing out of each nozzle depends upon the position of my special double seated throttle pilot valve 75.

When the valve 75 is in midway position between the nozzles 73 the flow of fluid from each nozzle is equal and the pressure on both sides of the operating piston 11 is also equal since orifices 79 are adjusted to produce this effect.

As soon, however, as there is a slight vertical motion of the pilot valve 75 from its neutral position, one nozzle becomes more restricted by the valve than the other nozzle and the difference in pressure on each side of the piston 11 so created results in its motion and consequently in motion of fluid flow regulating valve 24.

It is seen from the enlarged section of my pilot valve 75 in Figure 12 that, due to its peculiar shape, the jet issuing from each nozzle is deflected by the curvature of the valve surface, facing the nozzle opening, nearly 180° from its original direction.

Since the valve 75 is located very close to the nozzle ends it is subjected to two forces: one due to static pressure of the fluid at the nozzle end and another due to kinetic impact of the jet against the valve surface facing the jet.

Due to almost complete reversal of the jet direction the force of impact can be made almost twice the value which a jet issuing from the nozzle would have exerted against a flat surface.

Moreover, due to restriction imposed by the orifices 79 the static pressure at the nozzle tip decreases when the fluid flows through the nozzle, and consequently impact of the jet against the curved surface of the valve 75, increases, and vice versa.

These facts make it possible to so select the sizes of orifices 79 and of nozzles 73 as well as the angle of curvature of the pilot valve surfaces facing the jets and the amount of total travel of the pilot valve between the nozzles, as to obtain a balance between static and kinetic forces of each jet acting on the pilot valve 75 for any position of the valve between nozzles.

Since due to absence of packing around the valve stem 76 the only friction resisting the movement of the valve 75 is that due to the valve guides 80 and the nozzles, it follows from the above description that practically no force is required to operate my pilot valve through its whole range.

In this respect my double-seated, curved surface, jet restricting pilot valve is decidedly superior and different from any pilot valve yet invented.

The function of the spring 40 and dash pot 26 is identical with the function of similar parts of the regulator shown in Figure 1. That is, the spring 40 produces a straight line relationship between the changes in combined moment of forces acting on the lever 63 and the amount of movement of the lever 22. At the same time variable tension of the spring 40 balances other forces acting on the lever 63 and thus keeps lever 63 in its normal position except for a very small movement of lever 63 necessary to operate pilot valve 75.

As in the regulator of Figure 1 the dash pot 26 produces a slow acting compensating effect in cases when the pressure in the pipe 25 stays for a considerable period of time above or below its normal value.

In the case under consideration the regulator shown on the Figure 2 is adapted for the purpose of the upstream pressure regulation. It is evident that by reversing the direction of motion of the valve 24 in respect to that of the operating piston 11 and by transferring the pilot line 49 to downstream side of the valve 24, the regulator can be equally well adapted for the downstream pressure regulation.

Reference is now made to Figure 3.

The apparatus shown is still another modification of my rate responsive regulator. The purpose of the regulator here shown is to produce an effect which is directly proportional to the square of the rate or velocity at which the primary impulses are increasing or decreasing. In the particular case shown on the drawings the impulse takes the form of the deviation of the fluid pressure on the top of the diaphragm from the normal.

In this form of the invention the stem 20 passes through the upper end of a stirrup 81 through which extends a lever 82 fulcrumed on a knife edge 83 supported on the frame 16. This lever is held against the stem 20 by an adjustable spring 84 assisted by a sliding weight 85. Pivoted on a knife edge 86 is a second lever 87 which carries on its inner end a dash pot 88 having the usual bypass controlled by a valve 89. In this dash pot is a piston 90 having a rod or stem 91 which passes up into the lower end of stirrup 81 and engages beneath lever 82. A stem 92 extends downwardly from the dash pot and has the upper end of the spring 40 connected thereto. An adjustable weight 93 assists in balancing the lever 87. In the cylinder 10 are the same adjustable ports or orifices 79 as in the form shown in Figure 2 and these are supplied with auxiliary fluid under pressure by the pipe 72, the pipe 74 exhausting the fluid from the valve chest. Extending into the valve chest are opposed and alined pipes 88' having their proximal ends closed. These pipes have lateral ports 89' spaced from the closed ends and a sleeve valve 90' fits over these pipes to open one or the other to the interior of the valve chest. A stem 91' and rod 92' connect this valve to the lever 87.

In order to show how two regulators may be combined to control the position of valve 24, I have indicated in dotted lines at 95 a second regulator and have shown a linkage 94 connecting the levers 22 of these two regulators to the stem of the valve 24. Both regulators are connected to the pipe 49.

The effect in this case takes the form of powerful movement of the lever 22 and as such it may be combined with the movement of the operating lever 22 of any other regulator 95 by means of linkage 94 in such a way as to make the effects of both regulators additive in producing the combined effect represented by the movement of fluid flow regulating valve 24.

If the regulator 95 has a simple position characteristic in respect to the impulses actuating rate responsive regulator, the combined effect of both regulators will be in no wise different from the effect of the regulators shown in Figures 1 and 2.

The chief advantage of this modification of my regulator lies in the fact that it can be used in conjunction with a regulator 95 of any characteristic known to the art without disturbing this characteristic.

Since as it was proven mathematically, the rate responsive feature of my regulator counteracts the time lag due to long pilot line or other similar causes, the regulator shown in Figure 3 is particularly suited to be used as an attachment to any regulator whose action would have been impaired otherwise by the delay in transmitting the impulses through the long pilot lines.

The detailed explanation of the functioning of this modification is as follows:

The flexible diaphragm 18 is subjected on its top side to the fluid pressure as transmitted by the pilot line 49. Force on the piston produced by this pressure is transmitted through the stem 20 to the lever 82 pivoted on the knife edge support 83. The turning moment produced by this force on the lever is balanced by the weight 85 and the tension of the spring 84. Weight and the spring are so selected as to balance the lever 82 in a nearly horizontal position with the fluid pressure on the top of the diaphragm at its normal value.

Any change of this pressure from the normal means a corresponding change in the position of the lever 82 accompanied by the proportionate change in the tension of the spring 84.

In this way movement of the lever 82 follows the changes in pressure on the top of the diaphragm.

To the lever 82 is attached the dash pot piston 90 which moves, therefore, with the lever 82. The piston 90 is free to move inside the dash pot 88 which is attached to the lever 87 pivoted on the knife edge support 86 and which is balanced by the weight 93 and tension of the spring 40.

The dash pot 88 is filled with liquid which can flow through the adjustable bypass. The dash pot 88 is so adjusted that it has practically no restraining effect upon the movement of the lever 82.

To the lever 87 is attached the pilot valve 90' which controls the movement of the operating piston 11. The motive force for this regulator is provided by the auxiliary fluid under pressure admitted to the upper and lower side of the operating piston 11 through the adjustable ports 79.

In its neutral position the valve 90' covers the ports of the tubes 88' an equal amount, and therefore the flow of fluid through these ports and consequently pressure on both sides of the operating piston 11 is equal, since ports 79 are adjusted to be of the same size.

Therefore no movement of the piston 11 takes place with valve 90' in neutral position. As soon, however, as the pilot valve 90' is moved a small amount in a vertical direction, the ports of one tube are covered more than those of the other, and therefore different pressure is imposed on each side of the operating piston 11 producing the movement.

The pilot valve 90' is balanced hydraulically and therefore the only force resisting its movement is the friction between it and the tubes 88'. This friction can be reduced to an insignificant value due to the fact that comparatively large clearance between the valve 90' and tubes 88' has no effect upon the proper operation of the pilot valve.

The fluid passing out of the ports of the tubes 88' is drained freely through exhaust pipe 74. In this way no packing is required around the valve stem 91' and this fact reduces further the force necessary to operate the pilot valve 90'.

The movement of the operating piston 11 is transmitted through the lever 22 pivoted at 23 and through the linkage to the stem of valve 24. The lever 22 of regulator 95 is also attached to the linkage.

It will be understood from the drawings that my rate responsive regulator and regulator 95 can move the valve 24 independently of each other and without affecting thereby the operation of each other.

It is further understood from the above description that the application of even very small turning moment to the lever 87 will result in movement of operating piston 11 and consequently in changing of tension of the spring 40 in such manner and to such degree as to balance the moment imposed upon the lever 87.

Since the change of tension of the spring 40 is proportional to its deformation, it follows that the amount of movement of the operating piston 11 and therefore of valve 24 is proportional to the turning moment imposed upon lever 87, assuming that at the instant under consideration the regulator 95 is stationary.

The turning moment on the lever 87 is produced by the pressure of liquid on the bottom of the dash pot 88 and is therefore proportional to the liquid pressure. The pressure of liquid, on the other hand, is proportional to the square of the rate at which the piston 90 moves in respect to dash pot 88. The dash pot is held practically stationary due to balancing effect of the spring 40 and, therefore, it may be assumed that the pressure of liquid in the dash pot 88 on the dash pot bottom and consequently the amount of movement of the fluid flow regulating valve 24 is proportional to the square of the rate of movement of the piston 90.

Since, in turn, the rate of movement of the piston 90 is proportional to the rate of change of the pressure of fluid on the top of the diaphragm 18, it follows that the amount of movement of the valve 24 is proportional to the square of the rate of change of the fluid pressure on top of the diaphragm as transmitted to it by the pilot pipe 49.

If the shape of the valve 24 is so selected as to produce a direct proportionality between the amount of opening of the valve 24 and the flow of fluid through it, then a given rate of change of pressure on top of the diaphragm will produce a change in fluid flow through valve 24 which is proportional in magnitude to the squared absolute value of the rate of change of pressure on top of the diaphragm, assuming regulator 95 is stationary. Since, however, the pressure in pilot line 49 may serve also as an impulse for regulator 95, the actual change in flow through valve 24 will be equal to the algebraic sum of the effects produced by both the rate responsive regulator and regulator 95. The effect of each regulator is represented by the amount and direction of movement of the regulator operating levers 22, respectively.

If the regulator 95 has a position characteristic in respect to impulses transmitted to it through the pilot line 49, then the addition of the regulator of Figure 3 in the manner shown in the figure to the regulator 95 will transform it into a rate responsive regulator of the characteristic defined in the Equation (C) of this specification.

Now, for the purposes of this application it may be considered that the pipe 25 is a power supply. The diaphragm 18 may be termed an impulse receiving element. Such an impulse receiving element will vary in position and velocity of movement upon variations taking place in the power supply. The valve 24 will broadly represent a controlling element for the power supply. The various elements, including the dash pots and lever system form an operative connection between the impulse receiving element and the controlling element for the power supply, and as this operative connection does include the dash pot it includes means responsive to the magnitude of the changes impressed on the impulse receiving element and means responsive to the velocity of the changes impressed on the impulse receiving element. Further, the lever system forms means for effecting additive combination of the effects produced by the means responsive to the magnitude and the means responsive to the velocity of such changes. Finally, the pipe 49 forms means controlled by conditions in the power supply for controlling the impulse receiving element. This explanation is here made because there will now be discussed certain modifications wherein some of these elements will appear in other forms than shown in Figures 1, 2, and 3.

The form shown in Figure 4 represents a modification suitable for maintaining water at a uniform level in a tank. In this and the succeeding forms it is assumed that the regulator used is, in general, that shown in Figure 2 and, in order to avoid duplication only the modified parts of that figure are shown. In this form the pipe 25 is the supply line for the tank 95' and the valve 24 controls the rate of flow into the tank and is connected to the lever 22 (not shown) by a link 96. An outlet pipe 97 controlled by a valve 98 is used to draw the supply of water from the tank. The impulse receiving element here consists of the float 99 and the lever 100 connecting the stem 20 and the float. Further, this tank may be said to be a translating device since the kinetic energy of the inflowing water is translated into terms of head or pressure.

In Figure 6 is shown a form adapted to regulate the speed of an engine represented by the rotating shaft 105 driven by the engine, the power supply being the pipe 25 in Figure 2. Here the impulse receiving element is the governor 106 and lever 107.

In Figure 7 is shown a slight modification of the form shown in Figure 4, the float being eliminated and the pressure cell 17 being used. The tank in this instance is above the regulator and a pipe 108 connects the tank to the pressure cell above the diaphragm 18. Obviously a closed tank carrying gas pressure may be used in this form.

Figure 8 illustrates a modification for controlling an engine speed. A tank 109 and a rotating pump 110 are used to produce pressure on diaphragm 18 of the usual cell 17. The pump shaft 111 is driven by the engine. The intake of the pump receives liquid from the tank and pumps it through valved pipe 112 to the cell 17. A valved bypass 113 connects pipe 112 and the tank and, by proper adjustment of the valves, the pressure on diaphragm 18 and consequently the engine speed, can be regulated.

Figure 10:
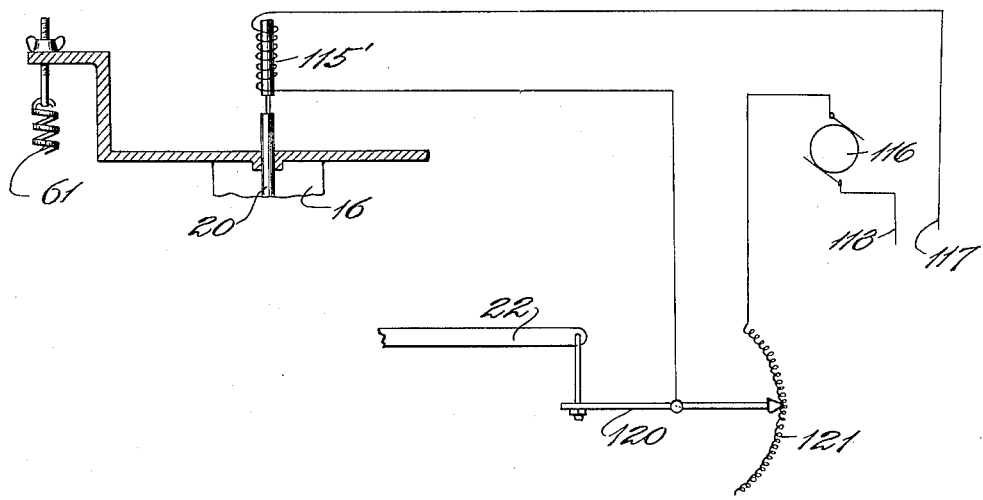
Figure 10 is a detail showing certain parts used in connection with the control of current for a motor or other electrical translating device.

A motor control is shown in Figure 10. A motor 116 receives current through power lines 117 and 118. One of these power lines has a solenoid 115' included in it, this solenoid being connected to the stem 20. The lever 22 moves the contact 120 over the resistance 121, the lever and resistance forming parts of the motor supply line. Variations in the current will affect the solenoid and the regulator will, through lever 22, vary the resistance to compensate for such current variations.

Temperature regulation may be effected by my regulator in the way shown in Figure 9. The thermostatic bulb 128 is partially filled with liquid 129 of a suitable boiling point. The pressure generated by the vaporization of liquid 129 will depend upon the temperature of medium 134 surrounding bulb 128. This pressure is transmitted to the pressure cell 17 of the regulator through the tube 127. The arm 22, not shown in this figure, is arranged to control the supply of heat energy to medium 134 in such a way as to increase the heat supply when the temperature is decreasing, and vice versa.

The constant flow regulation of the fluid in a closed conduit is illustrated in Figure 5. In this application the pressure cell 17 is provided with connections 130 and 131 on the top and bottom respectively. Connection 130 takes the fluid pressure from the point ahead of the Venturi tube 132 inserted in the conduit, while connection 131 transmits the pressure existing at the throat of the Venturi tube. Valve 24, not shown in this figure, controls the supply of fluid to the conduit, in which the flow is to be kept constant.

Figure 11:
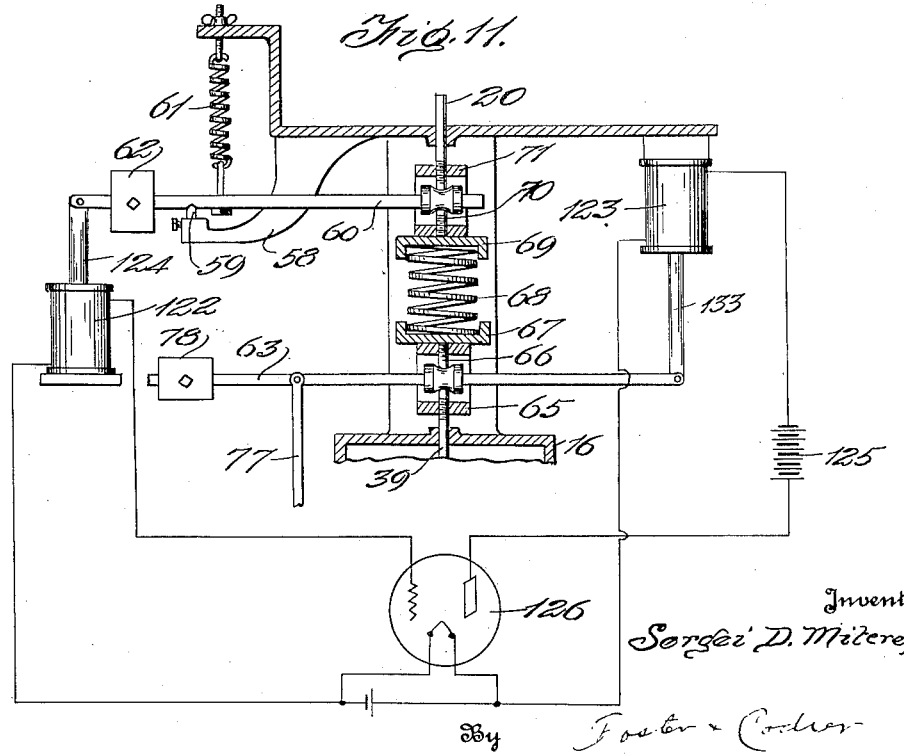
Figure 11 is a view of a solenoid type of the rate responsive element proper of the regulator.

In Figure 11 is shown a modification of the rate responsive element proper of the regulator, wherein the dash pot 43 and its piston 45 are replaced by solenoids 122 and 123. More specifically the piston 45 is replaced by the magnetic core 124 of the solenoid 122. The electrical connections between these solenoids include a battery 125 and a three element valve 126, so that the weak currents produced by movement of the core 124 with respect to its winding are amplified in a fixed ratio on the way to solenoid 123.

The strength of the current produced by the solenoid 122 is directly proportional to the velocity of movement of the core 124 in respect to its winding, and it is therefore proportional to the rate at which the power impulses applied to stem 20 are increasing or decreasing.

Since the core 133 is attached to lever 63 and since this core is attracted into solenoid 123 with a force proportional to the current flowing through the winding of solenoid 123, it follows that the characteristic of the regulator shown on Figure 2, and as modified in accordance with the Figure 11, can be expressed mathematically also by the equations B' and C' of this specification.

In the principal forms of my regulator shown in Figures 1, 2, and 3, the impulses take the form of fluid pressure transmitted through a pilot line. The pressure responsive element of the regulator in the form of a diaphragm produces a force which is proportional to the fluid pressure and to which the regulator responds.

Since any primary impulse irrespective of its form can be transformed by means known to the art into a force proportional to the primary impulse, it is evident that the application of my rate responsive regulator is in no way limited to these particular cases in which impulse takes the form of a fluid pressure, but that it can be equally well adapted to any other power flow control problem whatsoever, the representative examples of which were cited above in the specification, as well as shown in Figures 4, 5, 6, 7, 8, 9, and 10.

Similarly, the effect of my regulator is not limited to the control of fluid flow by means of a throttle valve, but may be equally well adapted to the control of any power flow through any other means known to the art.

Likewise, the rate responsive feature proper of my regulator does not need to be necessarily based on the effect of dash pot in generating the pressure of liquid in it in response to the movement of its piston, since similar results can be obtained from the rate responsive element proper based, for instance, upon the well known action of a magnet moving in respect to an electric coil in producing the electric current in the coil which is proportional to the velocity of movement of a magnetic field in respect to the coil, as is shown in Figure 11, or upon the action of a hydraulic, pneumatic, electrical or other equivalent of a dash pot.

The strictly operating parts of my regulator also are not limited to the particular forms described in this specification, since any effect magnifying apparatus of straight line characteristic and sufficient sensitiveness and accuracy can be adopted for this service.

In general, I do not want to limit my invention to the particular preferred embodiments described in this specification, since any apparatus or combination of apparatus having the characteristic defined in the Equations (C) and (C') of this specification falls into the scope of this invention.

I claim:

1. In a regulator for a power supply, an impulse receiving element, a main controlling element for the power supply, an operative connection between the impulse receiving element and the controlling element including means linearly responsive to the magnitude of changes impressed on the impulse receiving element and means linearly responsive to all velocities of such changes, said connection forming means for effecting additive combination of the effects produced by the means linearly responsive to the magnitude and means linearly responsive to the velocity of such changes, means arranged to actuate the main controlling element in unison with the said additive combination of the effects, and means for producing impulse effected changes in the impulse receiving element and controlled by the power supply.

2. In a regulator for a power supply, an impulse receiving element, a main controlling element for the power supply, and an operative connection between the impulse receiving element and the controlling element including means linearly responsive to the magnitude of changes impressed on the impulse receiving element and means linearly responsive to all velocities of such changes; said connection further including a power actuated movable element having the main controlling element connected thereto; this power actuated movable element arranged to move in unison with the algebraic sum of the responses of the said two means.

3. In a regulator for a power supply an impulse receiving element, a main controlling element for the power supply, an operative connection between the impulse receiving element and the controlling element including means linearly responsive to the magnitude of changes of impulses impressed on the impulse receiving element and means linearly responsive to all velocities of such changes, said connections forming means for effecting additive combination of the effects produced by the means linearly responsive to the magnitude of such changes and the means linearly responsive to the velocity of such changes, said connections further including a power actuated movable element, having the controlling element connected thereto, and a valve controlling the supply of power actuating the movable element, said valve being arranged to be actuated by the said means for effecting the additive combination of the effects in proportion to the additive combination of the effects produced by the means linearly responsive to the magnitude and the means linearly responsive to the velocity of changes of the impulses, and said connections further including means operatively connected to the movable element and the valve and arranged to effect the counteraction of the first said actuation of the valve in proportion to the amount of movement of the movable element, said impulses being effected by the changes in power supply controlled by the controlling element.

4. In a regulator for a power supply an impulse receiving element, a main controlling element for the power supply, an operative connection between the impulse receiving element and the controlling element including means linearly responsive to the magnitude of changes of impulses impressed on the impulse receiving element and means linearly responsive to all velocities of such changes, said connection forming means for effecting additive combination of the effects produced by the means linearly responsive to the magnitude and the means linearly responsive to the velocity of such changes, said connection further including a movable element actuated by a fluid under pressure, having the controlling element connected thereto, said movable element being linearly affected through the intermediary of said pilot valve by the additive combination of the effects produced by the means linearly responsive to the magnitude and the means linearly responsive to the velocity of such changes, said movable element having the supply of the fluid to it controlled by a double seated pilot valve restricting flow of fluid from two nozzles placed in opposition to each other, the valve being so shaped as to be balanced in any of its positions between the nozzles by the combined action of the static and velocity head of the fluid jets issuing from the nozzles and striking both seats of the valve.

5. In a regulator for a power supply an impulse receiving element, a main controlling element for the power supply, an operative connection between the impulse receiving element and the controlling element including means linearly responsive to the magnitude of changes of impulses impressed on the impulse receiving element and means linearly responsive to all velocities of such changes, said connections forming means for effecting additive combination of the effects produced by the means linearly responsive to the magnitude and the means linearly responsive to the velocity of such changes, said connections further including a movable element, actuated by a fluid under pressure, having the controlling element connected thereto, said movable element being affected through the intermediary of said pilot valve by the additive combination of the effects produced by the means linearly responsive to the magnitude and the means linearly responsive to the velocity of such changes, said movable element having the supply of fluid to it controlled by a cylindrical pilot valve sliding on two blind end tubes placed in opposition to each other and provided with circumferential slots near the ends covered partially or totally by the pilot valve depending on its position.

6. In a system comprising an energy flow control member and a motor supplied with a form of energy the flow of which to the motor is capable of being controlled by the said energy flow control member proper belonging to the system, said motor converting this energy into another form of energy the flow of which from the motor varies under the influence of factors external to the system, and a regulator responding to the variation in the motor speed arranged to produce in response to the variation of the motor speed the actuation of the energy flow control member proper; an auxiliary regulating means consisting of: a coil of electricity conducting wire, a magnetic member arranged to produce a magnetic field and so located as to cause a part of this magnetic field to intersect the wire, means responsive to the variation of the motor speed and arranged to move the coil and the magnetic member in respect to each other in unison with variation of the motor speed, means responsive to the electromotive force generated by variation in the intensity of the magnetic field intersecting the wire produced by the relative movement of the coil in respect to the magnetic member and arranged to produce, through the intermediary of the regulator in response to the variation of this electromotive force, the actuation of the energy flow control member proper of a magnitude proportional, at any given moment, to and of the direction equal, at any given moment, to the magnitude and the direction respectively, existing at that moment of the electromotive force generated in the coil, said last mentioned means being also arranged to produce actuation of the energy flow regulating member proper resulting from its operation in such a manner as not to interfere with the actuation of the energy flow regulating member proper which would have been produced by the regulator in response to the prevailing variation of the motor speed if the auxiliary regulating means were either non-existent or not in operation.

7. In an automatic regulator, a cylinder, a piston movable in said cylinder, a fluid pressure supply, valve means controlling the admission and exhaust of fluid from said supply to the ends of said cylinder, a piston rod carried by said piston, a control valve for the power to be regulated, an operative connection between said valve and the piston rod, a lever, means for holding said lever in normally balanced position, a yieldable connection between said lever and piston rod, an operative connection between said lever and the said valve means, a second lever, means for holding the second lever in normally balanced position, a yieldable connection between said levers, and means actuated by the power to be regulated and operatively connected to the second lever to move the latter as changes occur in the power to be regulated.

8. In an automatic regulator, a cylinder, a piston movable in said cylinder, a fluid pressure supply, valve means controlling the admission and exhaust of fluid from said supply to the ends of said cylinder, a piston rod carried by said piston, a control valve for the power to be regulated, an operative connection between said valve and the piston rod, a lever, means for holding said lever in normally balanced position, a yieldable connection between said lever and piston rod, an operative connection between said lever and the said valve means, a second lever, means for holding the second lever in normally balanced position, a dash pot carried by one of said levers and having a piston therein, a rod extending from the dash pot piston and connected to the other lever, and means actuated by the power to be regulated and operatively connected to the second lever to move the latter as changes occur in the power to be regulated.

9. In an automatic regulator, a cylinder, a piston movable in said cylinder, a fluid pressure supply, valve means controlling the admission and exhaust of fluid from said supply to the ends of said cylinder, a piston rod carried by said piston, a control valve for the power to be regulated, an operative connection between said valve and the piston rod, a lever, means for holding said lever in normally balanced position, a yieldable connection between said lever and piston rod, an operative connection between said lever and the said valve means, a second lever, means for holding the second lever in normally balanced position, a yieldable connection between said levers, a fluid pressure cell receiving fluid under pressure from the fluid to be regulated, and a stem projecting from said cell and engaging said second lever, said stem being movable in accordance with variations of pressure in said cell.

10. In an automatic regulator, a cylinder, a piston movable in said cylinder, a fluid pressure supply, valve means controlling the admission and exhaust of fluid from said supply to the ends of said cylinder, a piston rod carried by said piston, a control valve for the power to be regulated, an operative connection between said valve and the piston rod, a lever, means for holding said lever in normally balanced position, a yieldable connection between said lever and piston rod, an operative connection between said lever and the said valve means, a second lever, means for holding the second lever in normally balanced position, a dash pot carried by one of said levers and having a piston therein, a rod extending from the dash pot piston and connected to the other lever, a fluid pressure cell receiving fluid under pressure from the fluid to be regulated, and a stem projecting from said cell and engaging said second lever, said stem being movable in accordance with variations of pressure in said cell.

11. In an automatic fluid regulator, a cylinder, a piston movable in said cylinder, a fluid pressure supply for said cylinder, valve means controlling the admission and exhaust of fluid received from said supply to the ends of said cylinder, a control valve for the fluid to be regulated, a piston rod carried by said piston, an operative connection between said piston rod and control valve, a lever pivoted intermediate its ends, an operative connection between said lever and said valve means, a yieldable connection between said lever and piston rod, a second lever substantially parallel to the first lever, a dash pot and piston connection between said levers, spring means urging said second lever to normal position, and means operated from the fluid to be regulated and moving said second lever in accordance with changes of head in said fluid.

12. In an automatic fluid regulator, a cylinder, a piston movable in said cylinder, a fluid pressure supply for said cylinder, valve means controlling the admission and exhaust of fluid received from said supply to the ends of said cylinder, a control valve for the fluid to be regulated, a piston rod carried by said piston, an operative connection between said piston rod and control valve, a lever pivoted intermediate its ends, an operative connection between said lever and said valve means, a yieldable connection between said lever and piston rod, a second lever substantially parallel to the first lever, a dash pot and piston connection between said levers, spring means urging said second lever to normal position, a fluid pressure cell receiving fluid under pressure from the fluid to be regulated, and a stem projecting from said cell and engaging said second lever, said stem being movable in accordance with variations of pressure in said cell.

13. In an automatic fluid pressure regulator, a cylinder, a piston movable in said cylinder, a fluid pressure supply for said cylinder, a valve controlling the admission of fluid from said supply to the ends of the cylinder and controlling the exhaust of fluid from said ends, a piston rod carried by said piston, a control valve for the fluid to be regulated, an operative connection between said control valve and the piston rod, a lever fulcrumed intermediate its ends, a second lever fulcrumed intermediate its ends to swing in the same plane as the first lever, an operative connection between the first lever and the first mentioned valve, a dash pot carried by one end of one of said levers, a piston in said dash pot carried by the corresponding end of the remaining lever, a spring urging said second lever to move in one direction, a fluid pressure cell having a diaphragm therein and receiving fluid from the fluid under pressure to be regulated, a stem carried by said diaphragm and engaging the second lever to urge it to move against the action of said spring, and a yieldable connection between the first lever and piston rod.

14. In an automatic fluid pressure regulator, a cylinder, a piston movable in said cylinder, a fluid pressure supply for said cylinder, a valve controlling the admission of fluid from said supply to the ends of the cylinder and controlling the exhaust of fluid from said ends, a piston rod carried by said piston, a control valve for the fluid to be regulated, an operative connection between said control valve and the piston rod, a lever fulcrumed intermediate its ends, a second lever fulcrumed intermediate its ends to swing in the same plane as the first lever, an operative connection between the first lever and the first mentioned valve, a dash pot carried by one end of one of said levers, a piston in said dash pot carried by the corresponding end of the remaining lever, a spring urging said second lever to move in one direction, a fluid pressure cell having a diaphragm therein and receiving fluid from the fluid under pressure to be regulated, a stem carried by said diaphragm and engaging the second lever to urge it to move against the action of said spring, a dash pot carried by said piston rod, a spring connected to the first lever, and a piston carried by said spring and fitting the last mentioned dash pot.

15. In an automatic fluid pressure regulator, cylinder, a piston movable in said cylinder, a fluid pressure supply for said cylinder, a valve controlling the admission of fluid from said supply to the ends of the cylinder and controlling the exhaust of fluid from said ends, a piston rod carried by said piston, a control valve for the fluid to be regulated, an operative connection between said control valve and the piston rod, a lever fulcrumed intermediate its ends, a second lever fulcrumed intermediate its ends to swing in the same plane as the first lever, an operative connection between the first lever and the first mentioned valve, a dash pot carried by one end of one of said levers, a piston in said dash pot carried by the corresponding end of the remaining lever, a spring urging said second lever to move in one direction, a fluid pressure cell having a diaphragm therein and receiving fluid from the fluid under pressure to be regulated, a stem carried by said diaphragm and engaging the second lever to urge it to move against the action of said spring, a second fluid pressure cell interposed between said levers and supporting the fulcrum of the second lever, said second cell having a diaphragm and a stem connected to the first lever, and a pipe connection between the pressure sides of said cells.

16. In an automatic fluid pressure regulator, a cylinder, a piston movable in said cylinder, a fluid pressure supply for said cylinder, a valve controlling the admission of fluid from said supply to the ends of the cylinder and controlling the exhaust of fluid from said ends, a piston rod carried by said piston, a control valve for the fluid to be regulated, an operative connection between said control valve and the piston rod, a lever fulcrumed intermediate its ends, a second lever fulcrumed intermediate its ends to swing in the same plane as the first lever, an operative connection between the first lever and the first mentioned valve, a dash pot carried by one end of one of said levers, a piston in said dash pot carried by the corresponding end of the remaining lever, a spring urging said second lever to move in one direction, a fluid pressure cell having a diaphragm therein and receiving fluid from the fluid under pressure to be regulated, a stem carried by said diaphragm and engaging the second lever to urge it to move against the action of said spring, a dash pot carried by said piston rod, a spring connected to the first lever, a second fluid pressure cell interposed between said levers and supporting the fulcrum of the second lever, said second cell having a diaphragm and a stem connected to the first lever, and a pipe connection between pressure sides of said cells.

17. In an automatic fluid pressure regulator, a cylinder, a piston movable in said cylinder, a fluid pressure supply for said cylinder, a valve controlling the admission of fluid from said supply to the ends of the cylinder and controlling the exhaust of fluid from said ends, a piston rod carried by said piston, a control valve for the fluid to be regulated, an operative connection between said control valve and the piston rod, a lever fulcrumed intermediate its ends, a second lever fulcrumed intermediate its ends to swing in the same plane as the first lever, an operative connection between the first lever and the first mentioned valve, a dash pot carried by one end of one of said levers, a piston in said dash pot carried by the corresponding end of the remaining lever, a spring urging said second lever to move in one direction, a fluid pressure cell having a diaphragm therein and receiving fluid from the fluid under pressure to be regulated, a stem carried by said diaphragm and engaging the second lever to urge it to move against the action of said spring, and a spring interposed between said levers in opposition to said dash pot.

18. In an automatic fluid pressure regulator, a cylinder, a piston movable in said cylinder, a fluid pressure supply for said cylinder, a valve controlling the admission of fluid from said supply to the ends of the cylinder and controlling the exhaust of fluid from said ends, a piston rod carried by said piston, a control valve for the fluid to be regulated, an operative connection between said control valve and the piston rod, a lever fulcrumed intermediate its ends, a second lever fulcrumed intermediate its ends to swing in the same plane as the first lever, an operative connection between the first lever and the first mentioned valve, a dash pot carried by one end of one of said levers, a piston in said dash pot carried by the corresponding end of the remaining lever, a spring urging said second lever to move in one direction, a fluid pressure cell having a diaphragm therein and receiving fluid from the fluid under pressure to be regulated, a stem carried by said diaphragm and engaging the second lever to urge it to move against the action of said spring, a dash pot carried by said piston rod, a spring connected to the first lever, and a spring interposed between said levers in opposition to said dash pot.

19. In an automatic fluid pressure regulator, a cylinder, a piston movable in said cylinder, a fluid pressure supply for said cylinder, a valve controlling the admission of fluid from said supply to the ends of the cylinder and controlling the exhaust of fluid from said ends, a piston rod carried by said piston, a control valve for the fluid to be regulated, an operative connection between said control valve and the piston rod, a lever fulcrumed intermediate its ends, a second lever fulcrumed intermediate its ends to swing in the same plane as the first lever, an operative connection between the first lever and the first mentioned valve, a dash pot carried by one end of one of said levers, a piston in said dash pot carried by the corresponding end of the remaining lever, a spring urging said second lever to move in one direction, a fluid pressure cell having a diaphragm therein and receiving fluid from the fluid under pressure to be regulated, a stem carried by said diaphragm and engaging the second lever to urge it to move against the action of said spring, the dash pot between the levers being alined with the piston rod, and a spring connecting said piston and dash pot.

SERGEI D. MITEREFF.